(12) United States Patent
Choung

(10) Patent No.: US 10,968,798 B2
(45) Date of Patent: Apr. 6, 2021

(54) METHOD AND SYSTEM OF CONTROLLING OXYGEN PURGE OF THREE-WAY CATALYST

(71) Applicants: Hyundai Motor Company, Seoul (KR); Kia Motors Corporation, Seoul (KR)

(72) Inventor: Jin Woo Choung, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/683,079

(22) Filed: Nov. 13, 2019

(65) Prior Publication Data
US 2020/0370458 A1 Nov. 26, 2020

(30) Foreign Application Priority Data
May 21, 2019 (KR) ........................ 10-2019-0059352

(51) Int. Cl.
| F02D 41/10 | (2006.01) |
| F01N 3/10 | (2006.01) |
| F01N 9/00 | (2006.01) |
| F02D 41/12 | (2006.01) |
| F02D 41/02 | (2006.01) |
| F01N 3/20 | (2006.01) |
| B01D 53/94 | (2006.01) |

(52) U.S. Cl.
CPC ............ *F01N 3/101* (2013.01); *F01N 9/00* (2013.01); *F02D 41/0295* (2013.01); *F02D 41/10* (2013.01); *F02D 41/126* (2013.01); *B01D 53/9454* (2013.01); *B01D 53/9495* (2013.01); *B01D 2255/908* (2013.01); *F01N 3/2093* (2013.01); *F01N 2430/06* (2013.01); *F01N 2560/025* (2013.01); *F01N 2900/1624* (2013.01)

(58) Field of Classification Search
CPC ............ F01N 3/101; F01N 2430/06; F01N 2560/025; F01N 2900/1624; F02D 41/123; F02D 41/126
See application file for complete search history.

(56) References Cited

U.S. PATENT DOCUMENTS

2014/0060016 A1* 3/2014 Sato .................... F02D 41/0295
60/286
2016/0363029 A1* 12/2016 Suzuki .................. F01N 3/0864

* cited by examiner

*Primary Examiner* — Jonathan R Matthias
(74) *Attorney, Agent, or Firm* — Morgan, Lewis & Bockius LLP

(57) ABSTRACT

A method of controlling an oxygen purge of a three-way catalyst (TWC) may include: rapidly adjusting, by a controller, an air-fuel ratio (AFR) at an upstream of the TWC to a target AFR when the oxygen purge of the TWC after a fuel cut-off is performed; and maintaining the target AFR until an oxygen purge finish time has passed. According to the method, concentration of NOx slipped from the TWC after the oxygen purge may be reduced.

15 Claims, 12 Drawing Sheets

(a) conventional AFR control (b) AFR control according to present disclosure

METHOD AND SYSTEM OF CONTROLLING OXYGEN PURGE OF THREE-WAY CATALYST

CROSS-REFERENCE TO RELATED APPLICATION

The present application claims priority to Korean Patent Application No. 10-2019-0059352 filed on May 21, 2019, the entire contents of which is incorporated herein for all purposes by this reference.

BACKGROUND OF THE INVENTION

Field of the Invention

The present invention relates to a method and a system of controlling an oxygen purge of a three-way catalyst (TWC). More particularly, the present invention relates to a method and a system of controlling an oxygen purge of a three-way catalyst which can minimize slip of nitrogen oxide (NOx) from the TWC when an oxygen purge of the TWC.

Description of Related Art

A vehicle is provided with a catalytic converter to reduce emission (EM) contained in the exhaust gas. The exhaust gas flowing out from an engine through an exhaust manifold is driven into a catalytic converter mounted at an exhaust pipe and is purified therein. After that, noise of the exhaust gas is decreased while passing through a muffler and the exhaust gas is then emitted into the air through a tail pipe. The catalytic converter purifies the EM contained in the exhaust gas. Furthermore, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly mounted in gasoline vehicles, and Pt/Rh, Pd/Rh or Pt/Pd/Rh systems are used as the TWCs.

The internal combustion engine provided with the TWC performs a fuel cut-off to improve fuel economy under specific driving conditions. In the instant case, an oxygen storage material in the TWC stores oxygen ($O_2$) therein. Since a purifying efficiency of the NOx is poor if the oxygen storage material stores a large amount of the $O_2$, an oxygen purge is performed to remove the $O_2$ stored in the TWC. The oxygen purge is performed by controlling an air-fuel ratio (AFR) of the exhaust gas at an upstream of the TWC to be rich.

The AFR of the exhaust gas is rich during the oxygen purge while the AFR in the TWC is lean due to the $O_2$ stored therein when performing the fuel cut-off. Therefore, the TWC cannot reduce but exhausts the NOx. Concentration of the NOx slipped from the TWC is closely related to a control of the AFR at the upstream of the TWC during the oxygen purge.

FIG. 1 is a graph showing examples of concentration of NOx slipped from a TWC when an AFR at an upstream of the TWC is controlled according to a conventional exemplary control strategy for an increasing vehicle speed after being decreased. The graphs in FIG. 1 show an exemplary vehicle speed when the vehicle is accelerated after the fuel cut-off, an exemplary AFR control at the upstream of the TWC performed for the exemplary vehicle speed, and an exemplary concentration change of the NOx slipped from the TWC when the exemplary AFR control is performed. It is to be understood that the vehicle speed when the vehicle is accelerated after the fuel cut-off, the AFR control at the upstream of the TWC performed for the vehicle speed, and the concentration change of the NOx slipped from the TWC when the AFR control is performed does not always vary according to graphs illustrated in FIG. 1.

Referring to FIG. 1, the controller continuously detects a driving condition of the vehicle such as the vehicle speed, an engine speed, an opening of an accelerator pedal position sensor, an intake amount, etc and determines whether a fuel cut-off condition is satisfied. The controller is configured to determine that the fuel cut-off condition is satisfied and performs the fuel cut-off at a time ($t_{fco}$). Since the fuel is not injected during the fuel cut-off is performed, the AFR (Here, it will be denoted as a 'lambda ($\lambda$)') at the upstream of the TWC is rapidly increased (i.e., the AFR at the upstream of the TWC rapidly becomes a lean AFR.), and the vehicle speed is gradually decreased.

After the fuel cut-off is performed, the controller performs the oxygen purge at a time ($t_{fci}$) to remove the $O_2$ stored in the TWC by resuming fuel supply which was stopped.

In early oxygen purge, the lambda is rapidly decreased to a target AFR (i.e., the AFR at the upstream of the TWC becomes a rich AFR.). At the instant time, since the AFR inside the TWC is lean, the NOx begins to be firstly slipped from the TWC. Here, the concentration of the NOx slipped from the TWC in the early oxygen purge will be called a first slip concentration X1.

Thereafter, the controller increases the lambda gradually and continues to perform the oxygen purge.

If it is determined that the vehicle firstly accelerates at a time ($t_{pc}$), the controller finishes the oxygen purge and reinstates the lambda to a stoichiometric AFR ($\lambda=1$). At the instant time, the NOx begins to be secondarily slipped from the TWC. Here, the concentration of the NOx slipped from the TWC after the vehicle accelerates firstly will be called a second slip concentration X2.

Thereafter, the controller controls the lambda according to the driving condition (typically, the lambda is feedback-controlled to be the stoichiometric AFR.).

If the vehicle accelerates secondarily after the first acceleration (i.e., an acceleration of the vehicle changes), the NOx is thirdly slipped from the TWC. Here, the concentration of the NOx slipped from the TWC after the vehicle secondarily accelerates will be called a third slip concentration X3.

However, it has been found that the first, second, and third slip concentrations X1, X2, and X3 are related to the AFR control at the upstream of the TWC in the oxygen purge.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and a system of controlling an oxygen purge of a three-way catalyst (TWC) having advantages of reducing concentration of nitrogen oxide (NOx) slipped from the TWC in the oxygen purge by optimally controlling an air-fuel ratio at an upstream of the TWC.

A method of controlling an oxygen purge of a three-way catalyst (TWC) according to an exemplary embodiment of the present invention may include: rapidly adjusting, by a controller, an air-fuel ratio (AFR) at an upstream of the TWC to a target AFR when the oxygen purge of the TWC after a fuel cut-off is performed; and maintaining, by the controller, the target AFR until the oxygen purge is finished.

The oxygen purge may be finished when the AFR at a downstream of the TWC reaches a stoichiometric AFR.

The method may further include: monitoring if a vehicle accelerates after the oxygen purge is finished; and maintaining, if the vehicle accelerates, the target AFR for a predetermined delay time.

The method may further include including rapidly adjusting the AFR at the upstream of the TWC to the stoichiometric AFR after maintaining the target AFR for the predetermined delay time.

The predetermined delay time may be within a range of 1 second to 3 seconds.

The method may further include including rapidly adjusting the AFR at the upstream of the TWC to the stoichiometric AFR if the vehicle does not accelerate after the oxygen purge is finished.

The target AFR may be maintained for a standby time after the oxygen purge is finished, and whether the vehicle accelerates may be determined after the standby time has passed.

A method of controlling an oxygen purge of a three-way catalyst (TWC) according to various exemplary embodiments of the present invention may include: rapidly adjusting, by a controller, an air-fuel ratio (AFR) at an upstream of the TWC to a target AFR when the oxygen purge of the TWC after a fuel cut-off is performed; maintaining, by the controller, the target AFR until the oxygen purge is finished; determining whether a vehicle accelerates; and rapidly adjusting, if the vehicle accelerates, the AFR at the upstream of the TWC to a stoichiometric AFR after the target AFR is maintained for a predetermined delay time.

The oxygen purge may be finished when the AFR at a downstream of the TWC reaches the stoichiometric AFR.

The predetermined delay time may be within a range of 1 second to 3 seconds.

The method may further include rapidly adjusting the AFR at the upstream of the TWC to the stoichiometric AFR if the vehicle does not accelerate after the oxygen purge is finished.

The target AFR may be maintained for a standby time after the oxygen purge is finished, and whether the vehicle accelerates may be determined after the standby time has passed.

A system of controlling an oxygen purge of a three-way catalyst (TWC) according to other exemplary embodiment of the present invention may include: an engine configured of generating power by burning a mixture of an air and a fuel and exhausting an exhaust gas through an exhaust pipe; an injector supplying the fuel into the engine; a controller connected to the injector and configured to adjust an air-fuel ratio (AFR) at an upstream of the TWC, wherein the TWC is mounted on the exhaust pipe at a downstream of the engine and is configured to purify emission contained in the exhaust gas, wherein the controller adjusts the AFR at the upstream of the TWC by determining a fuel amount which is to be supplied based on a current intake amount and controlling the injector to inject the determined fuel amount, and, wherein the controller, when the oxygen purge during which oxygen in the TWC is purged after a fuel cut-off during which fuel injection is stopped, is configured to rapidly adjust the AFR at the upstream of the TWC to a target AFR and to maintain the target AFR until the oxygen purge is finished.

The oxygen purge may be finished when the AFR at a downstream of the TWC reaches a stoichiometric AFR.

The controller may be configured to determine whether a vehicle accelerates after the oxygen purge is finished, and to maintain, if the vehicle accelerates, the target AFR for a predetermined delay time.

The predetermined delay time may be within a range of 1 second to 3 seconds.

The controller may be configured to rapidly adjust the AFR at the upstream of the TWC to the stoichiometric AFR when the predetermined delay time has passed after the oxygen purge is finished.

The controller may be configured to rapidly adjust the AFR at the upstream of the TWC to the stoichiometric AFR if the vehicle does not accelerate after the oxygen purge is finished.

The controller may be configured to maintain the target AFR for a standby time after the oxygen purge is finished, and to determine whether the vehicle accelerates after the standby time has passed.

According to exemplary embodiments of the present invention, an air-fuel ratio at an upstream of a three-way catalyst is rapidly adjusted to a target AFR and the target AFR is then maintained until an oxygen purge is finished. Therefore, first, second, and third slip concentrations may be reduced.

Furthermore, since the target AFR is further maintained for a predetermined delay time after the oxygen purge is finished, the third slip concentration may be further reduced.

Furthermore, since the target AFR is further maintained for a standby time after the oxygen purge is finished and whether a vehicle accelerates is determined after the standby time has passed, the secondary and third slip concentrations may be further reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
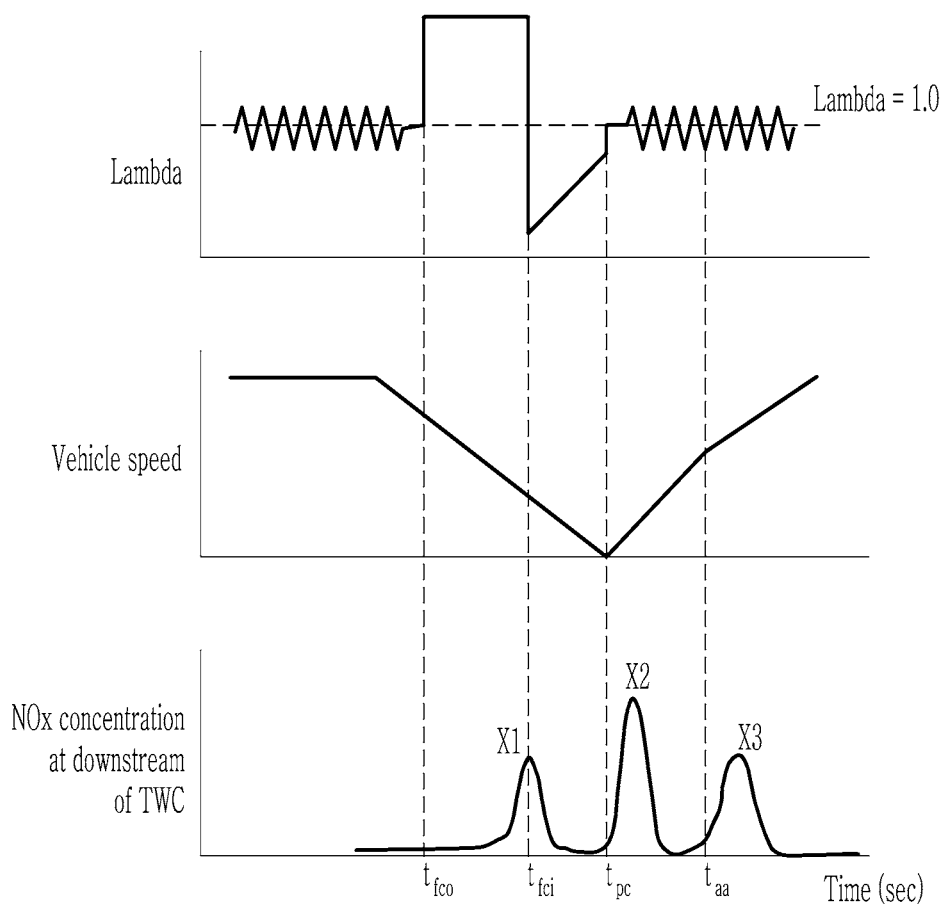
FIG. 1 is a graph showing examples of concentration of NOx slipped from a TWC when an AFR at an upstream of the TWC is controlled according to a conventional exemplary control strategy for an increasing vehicle speed after being decreased.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terminology used herein is for describing various exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in the exemplary embodiment, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via or more intermediary components.

It is understood that the term "vehicle," "vehicular," "car," or other similar term as used herein is inclusive of motor vehicles, in general, such as passenger vehicles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system including the controller, as described in detail below.

Furthermore, the controller of the present invention may be embodied as non-transitory computer readable media including executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

The term "stoichiometric AFR" or other similar term as used herein means a weight ratio for a fuel and an oxygen ($O_2$) to be oxidized to cause complete combustion, and means $\lambda=1$.

The term "lean AFR" or other similar term as used herein means a state where an actual fuel amount is less than a fuel amount required at the stoichiometric AFR, and means $\lambda>1$.

The term "rich AFR" or other similar term as used herein means a state where an actual fuel amount is greater than the fuel amount required at the stoichiometric AFR, and means $\lambda<1$.

Hereinafter, various exemplary embodiments of the present invention will be described in detail with reference to the accompanying drawings.

Figure 2:
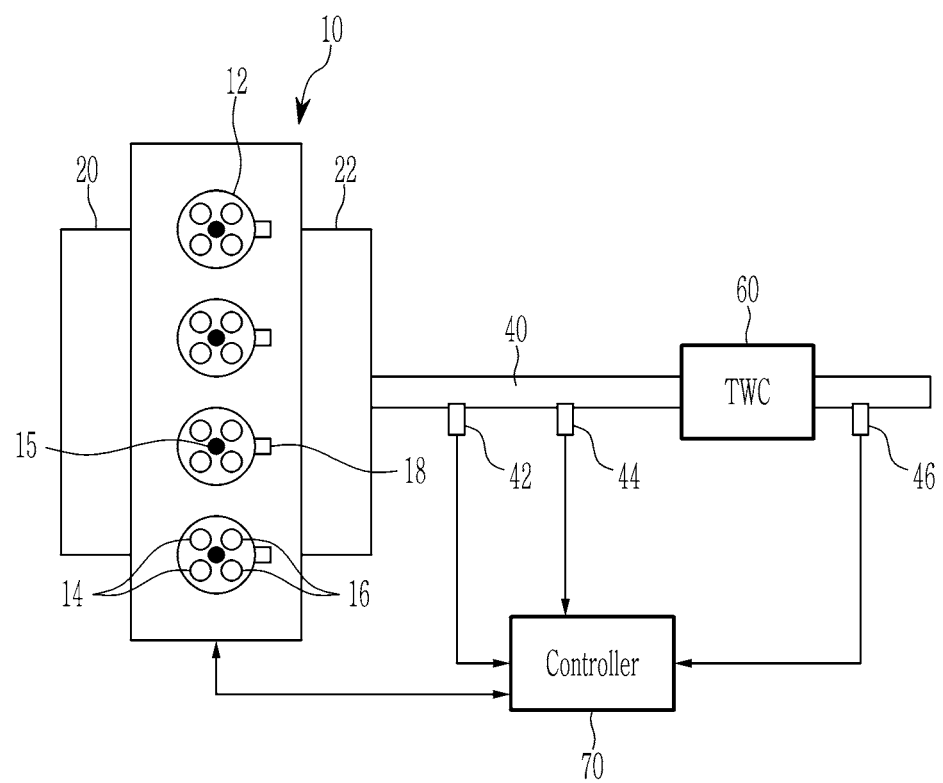
FIG. 2 is a schematic diagram of a system of controlling an oxygen purge of a TWC according to an exemplary embodiment of the present invention.

FIG. 2 is a schematic diagram of a system of controlling an oxygen purge of a TWC according to an exemplary embodiment of the present invention.

As shown in FIG. 2, a system of controlling an oxygen purge of a three-way catalyst (TWC) according to an exemplary embodiment of the present invention includes an engine 10, an exhaust pipe 40, the three-way catalyst 60 and a controller 70.

The engine 10 burns an air-fuel mixture to convert chemical energy into mechanical energy. The engine 10 includes a combustion chamber 12, an intake valve 14, an ignition plug 15, an exhaust valve 16, an injector 18, an intake manifold 20 and an exhaust manifold 22.

The combustion chamber 12 is connected to the intake manifold 20 and receives an air or a mixture of the air and a fuel. An intake port is formed at the combustion chamber 12 and is provided with the intake valve 14. The intake valve 14 is operated by a rotation of a camshaft connected to a crankshaft to open or close the intake port. When the intake valve 14 opens the intake port, the air or the air-fuel mixture in the intake manifold 20 flows into the combustion chamber 12 through the intake port. When the intake valve 14 closes the intake port, on the other hand, the air or the air-fuel mixture in the intake manifold 20 does not flow into the combustion chamber 12. Furthermore, the combustion chamber 12 is connected to the exhaust manifold 22 so that the exhaust gas generated in the combustion process is collected in the exhaust manifold 22 and flows out to the exhaust pipe 40. An exhaust port is formed at the combustion chamber 12 and is provided with the exhaust valve 16. The exhaust valve 16 is also operated by the rotation of the camshaft connected to the crankshaft to open or close the exhaust port. When the exhaust valve 16 opens the exhaust port, the exhaust gas in the combustion chamber 12 flows to the exhaust manifold 22 through the exhaust port. When the exhaust valve 16 closes the exhaust port, on the other hand, the exhaust gas in the combustion chamber 12 does not flow to the exhaust manifold 22.

Depending on types of the engine, the combustion chamber 12 may be provided with the injector 18 to inject the fuel into the combustion chamber 12 (e.g., in a case of a gasoline direct injection engine). Furthermore, depending on the types of the engine, the ignition plug 15 may be provided at a top portion of the combustion chamber 12 to ignite the air-fuel mixture in the combustion chamber 12 (e.g., in a case of a gasoline engine).

The exhaust pipe 40 is connected to the exhaust manifold 22 to discharge the exhaust gas to an outside of a vehicle. Various catalytic converters are mounted on the exhaust pipe 40 to remove emission (EM) contained in the exhaust gas. For convenience of explanation, it is exemplified that the TWC 60 is mounted on the exhaust pipe 40, but it is to be understood that the catalytic converter mounted on the exhaust pipe 40 is not limited to the TWC 60.

The TWC 60 is mounted on the exhaust pipe 40 through which the exhaust gas discharged from the engine 10 flows, and harmful materials including CO, HC, and NOx contained in the exhaust gas are converted into harmless components by an oxidation-reaction reaction in the TWC 60. Since the TWC 60 is well-known to a person of an ordinary skill in the art, a detailed description thereof will be omitted.

The exhaust pipe 40 is provided with a plurality of sensors 42, 44, and 46 for detecting a combustion state and a function of the TWC 60.

The temperature sensor 42 is mounted on the exhaust pipe 40 at an upstream of the TWC 60, detects a temperature of the exhaust gas at the upstream of the TWC 60, and transmits a signal corresponding thereto to the controller 70.

The first oxygen sensor 44 is mounted on the exhaust pipe 40 at the upstream of the TWC 60, detects $O_2$ concentration in the exhaust gas at the upstream of the TWC 60, and transmits a signal corresponding thereto to the controller 70. An air-fuel ratio (hereinafter, it will be called 'λ') of the exhaust gas described herein means an air-fuel ratio (AFR) at an upstream of the TWC 60 and may be a value detected by the first oxygen sensor 44. Also, an AFR control described herein means a control of AFR of the exhaust gas to be a target AFR according to a driving condition.

The second oxygen sensor 46 is mounted on the exhaust pipe 40 at a downstream of the TWC 60, detects $O_2$ concentration in the exhaust gas at the downstream of the TWC 60, and transmits a signal corresponding thereto to the controller 70. A value detected by the second oxygen sensor 46 may be used to determine whether an oxygen storage capacity (OSC) of the TWC 60 is completely consumed, which is whether an oxygen purge is finished.

Figure 10:
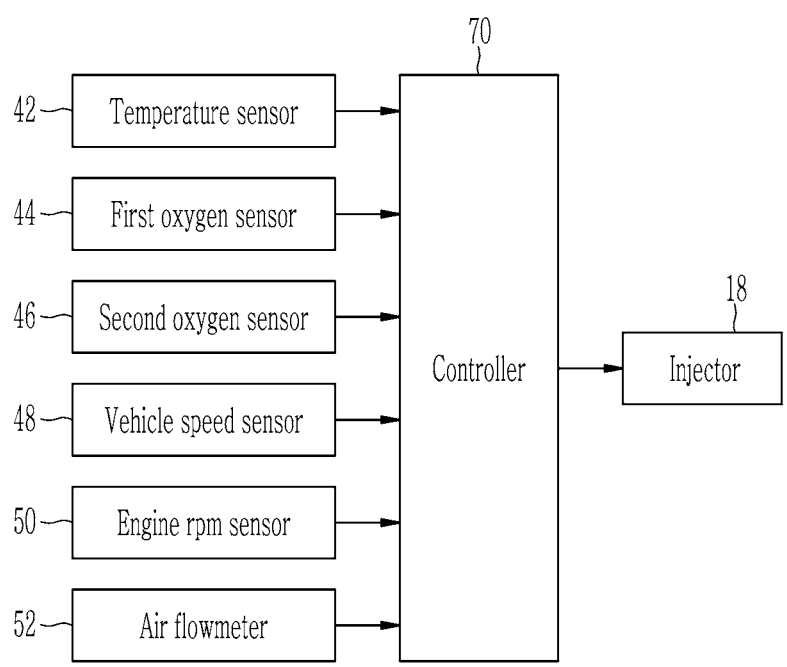
FIG. 10 is a block diagram of a system of controlling an oxygen purge of a TWC according to an exemplary embodiment of the present invention.

In addition to the sensors 42, 44, and 46 described herein, a system for controlling the engine may further include various sensors. For example, an additional temperature sensor may be mounted on the exhaust pipe 40 at the downstream of the TWC 60 to detect the temperature of the exhaust gas at the downstream of the TWC 60. Furthermore, as shown in FIG. 10, the system of controlling an oxygen purge of a three-way catalyst may further include a vehicle speed sensor 48, an engine rotation speed sensor 50 and an air flowmeter 52. Furthermore, the system of controlling the oxygen purge of the TWC may further include a NOx sensor, an HC sensor or a CO sensor mounted on the exhaust pipe 40, and concentration of the EM contained in the exhaust gas may be detected via these sensors.

The controller 70 is electrically connected to the sensors 42, 44, 46, 48, 50, and 52 to receive the signals corresponding to the detected values by the sensors 42, 44, 46, 48, 50, and 52, and determines the combustion state, the AFR of the exhaust gas, whether the TWC 60 normally operates, whether the oxygen purge is finished, and/or the driving condition of the vehicle based on the signals. The controller 70 controls at least one of an ignition timing of the ignition plug 15, the AFR of the exhaust gas, and a fuel injection amount and/or a fuel injection timing of the injector 18 based on the determination results. The controller 70 may be implemented with one or more processors executed by a predetermined program and the predetermined program may be programmed to perform each step of a method of controlling an oxygen purge of a three-way catalyst according to an exemplary embodiment of the present invention.

With reference to FIG. 3 to FIG. 9, a concentration of the NOx slipped from the TWC 60 when the AFR at the upstream of the TWC 60 ratio (i.e., the AFR of the exhaust gas) is controlled according to various control strategies when the oxygen purge is performed after the fuel cut-off will hereinafter described. For better comprehension and ease of description, repetitively changing vehicle speeds are exemplified as the driving condition of the vehicle. Here, the repetitively changing vehicle speeds includes a region where the vehicle speed is decelerated and a region where the vehicle speed is accelerated. The region where the vehicle speed is decelerated and the region where the vehicle speed is accelerated are alternately repeated.

Figure 3:
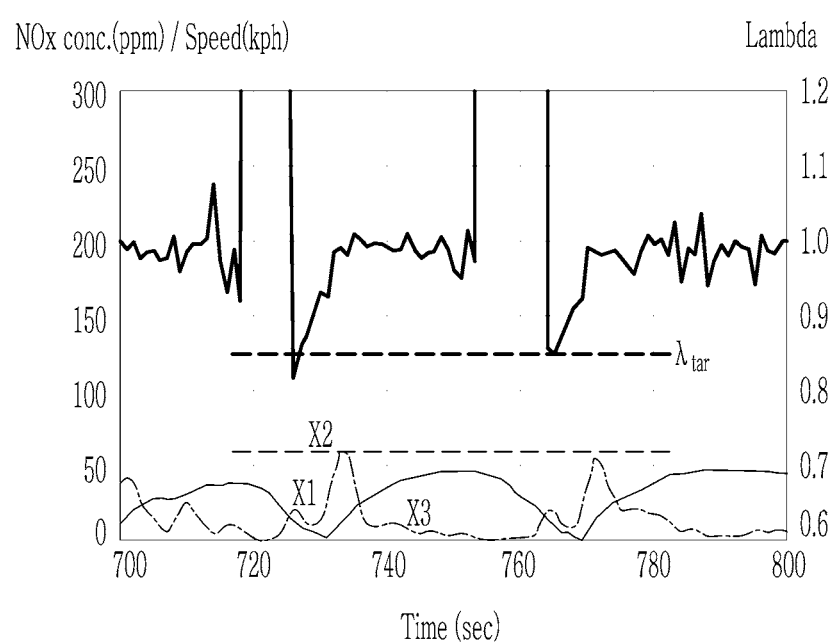
FIG. 3 is a graph showing examples of concentration of NOx slipped from a TWC when an AFR at an upstream of the TWC is controlled according to a first exemplary control strategy for a repetitively changing vehicle speed.
Figure 4:
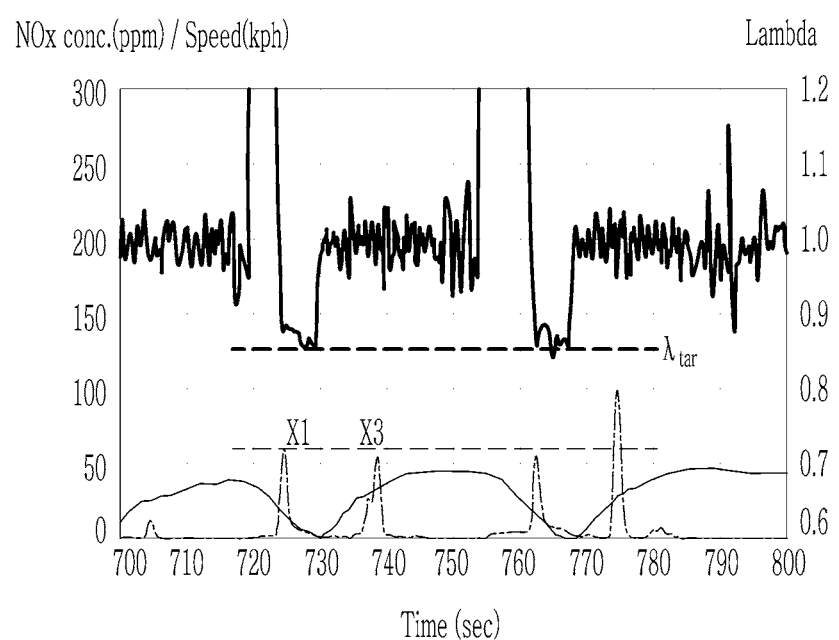
FIG. 4 is a graph showing examples of concentration of NOx slipped from a TWC when an AFR at an upstream of the TWC is controlled according to a second exemplary control strategy for a repetitively changing vehicle speed.
Figure 5:
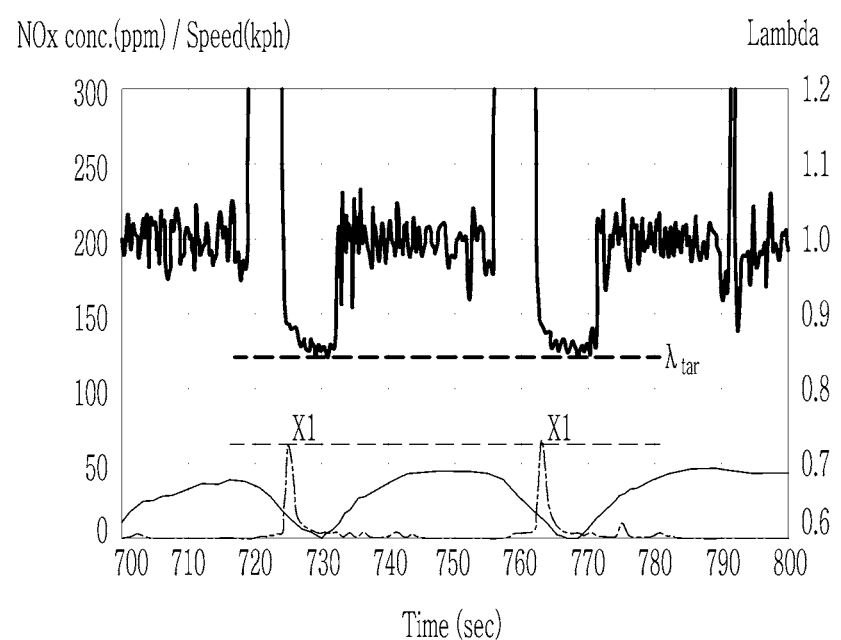
FIG. 5 is a graph showing examples of concentration of NOx slipped from a TWC when an AFR at an upstream of the TWC is controlled according to a third exemplary control strategy for a repetitively changing vehicle speed.
Figure 6:
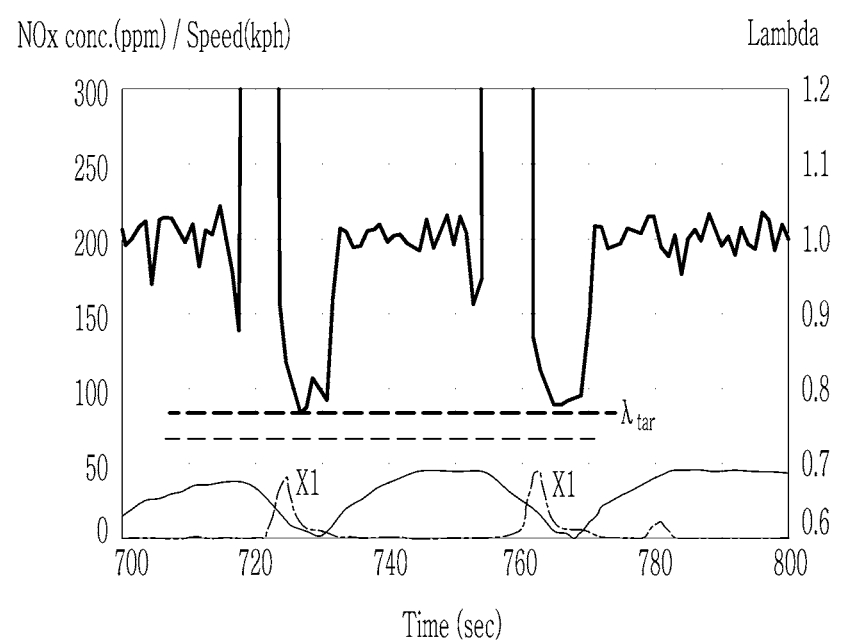
FIG. 6 is a graph showing examples of concentration of NOx slipped from a TWC when an AFR at an upstream of the TWC is controlled according to a fourth exemplary control strategy for a repetitively changing vehicle speed.
Figure 7:
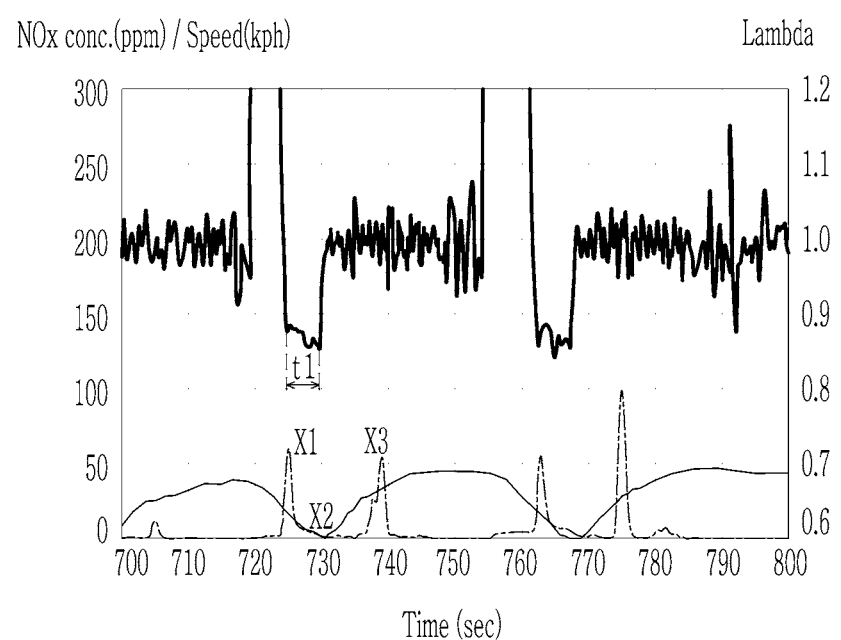
FIG. 7 is a graph showing examples of concentration of NOx slipped from a TWC when an AFR at an upstream of the TWC is controlled according to a fifth exemplary control strategy for a repetitively changing vehicle speed.
Figure 8:
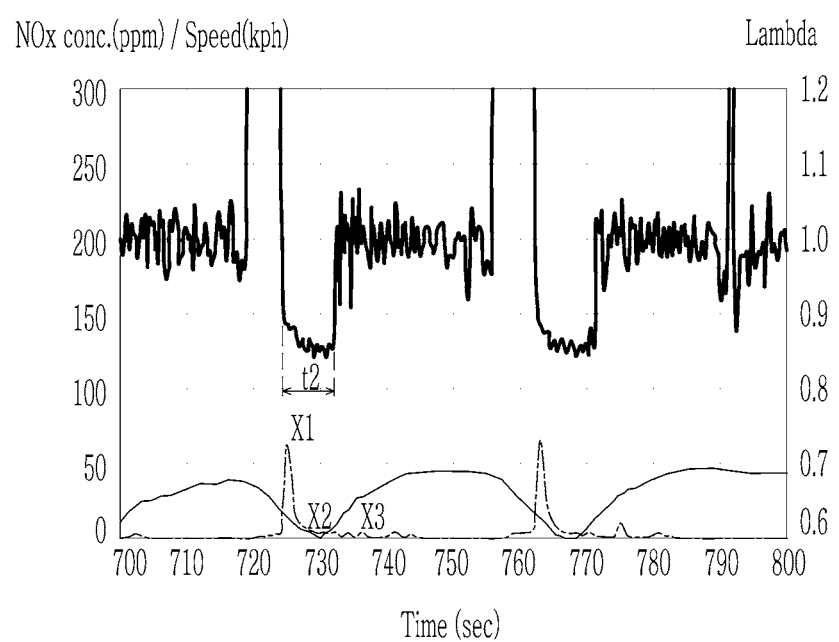
FIG. 8 is a graph showing examples of concentration of NOx slipped from a TWC when an AFR at an upstream of the TWC is controlled according to a sixth exemplary control strategy for a repetitively changing vehicle speed.

FIG. 3 is a graph showing examples of concentration of NOx slipped from a TWC when an AFR at an upstream of the TWC is controlled according to a first exemplary control strategy for a repetitively changing vehicle speed; FIG. 4 is a graph showing examples of concentration of NOx slipped from a TWC when an AFR at an upstream of the TWC is controlled according to a second exemplary control strategy for a repetitively changing vehicle speed; FIG. 5 is a graph showing examples of concentration of NOx slipped from a TWC when an AFR at an upstream of the TWC is controlled according to a third exemplary control strategy for a repetitively changing vehicle speed; FIG. 6 is a graph showing examples of concentration of NOx slipped from a TWC when an AFR at an upstream of the TWC is controlled according to a fourth exemplary control strategy for a repetitively changing vehicle speed; FIG. 7 is a graph showing examples of concentration of NOx slipped from a TWC when an AFR at an upstream of the TWC is controlled according to a fifth exemplary control strategy for a repetitively changing vehicle speed; FIG. 8 is a graph showing examples of concentration of NOx slipped from a TWC when an AFR at an upstream of the TWC is controlled according to a sixth exemplary control strategy for a repetitively changing vehicle speed; and FIG. 9 is a graph showing examples of concentration of NOx slipped from a TWC when an AFR at an upstream of the TWC is controlled according to seventh and eighth exemplary control strategies for a repetitively changing vehicle speed.

In FIG. 3 to FIG. 8, a bold solid line represents the AFR (λ) at the upstream of the TWC 60, a thin solid line represents the vehicle speed, a bold dotted line represents the target AFR ($\lambda_{tar}$), and a single-dot chain line represents the concentration of the NOx slipped from the TWC 60.

Figure 9:
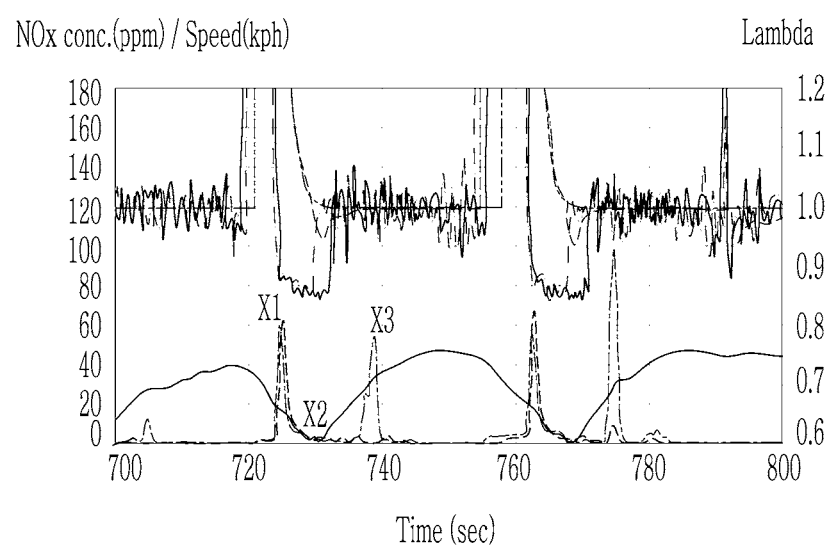
FIG. 9 is a graph showing examples of concentration of NOx slipped from a TWC when an AFR at an upstream of the TWC is controlled according to seventh and eighth exemplary control strategies for a repetitively changing vehicle speed.

Furthermore, an upper solid line represents the AFR at the upstream of the TWC 60 according to the seventh control strategy, an upper single-dot chain line represents the AFR at the upstream of the TWC 60 according to the eighth control strategy, an upper double-dot chain line represents the AFR at a downstream of the TWC 60 according to the seventh control strategy, an upper dotted line represents the AFR at the upstream of the TWC 60 according to the eighth control strategy, a lower solid line represents the vehicle speed, a lower single-dot chain line represents the concentration of the NOx slipped from the TWC 60 when the AFR is controlled according to the seventh control strategy, and a lower dotted line represents the concentration of the NOx slipped from the TWC 60 when the AFR is controlled according to the eighth control strategy, in FIG. 9.

The vehicle speed illustrated in FIG. 3 to FIG. 9 is designed to repeat the vehicle speed change illustrated in FIG. 1. Thus, the NOx may be slipped from the TWC 60 three times during one period. That is, first to third slip concentrations X1, X2, and X3 may occur.

FIG. 3 and FIG. 4 are graphs for comparing the first, second, and third slip concentrations X1, X2, and X3 according to AFR control patterns of the exhaust gas when the oxygen purge of the TWC 60 is performed. The target AFR ($\lambda_{tar}$) of the first control strategy is the same as that ($\lambda_{tar}$) of the second control strategy, and an oxygen purge duration of the first control strategy is the same as that of the second control strategy.

According to the first AFR control pattern shown in FIG. 3, if the oxygen purge begins after the fuel cut-off is performed due to decrease of the vehicle speed, the AFR at the upstream of the TWC 60 is rapidly adjusted to the target AFR ($\lambda_{tar}$). After that, the AFR at the upstream of the TWC 60 is gradually increased until the vehicle speed is increased again. If the vehicle speed begins to be increased, the AFR at the upstream of the TWC 60 is recovered to the stoichiometric AFR (λ=1).

According to the second AFR control pattern shown in FIG. 4, if the oxygen purge begins after the fuel cut-off is performed due to decrease of the vehicle speed, the AFR at the upstream of the TWC 60 is rapidly adjusted to a predetermined rich AFR (λ>$\lambda_{tar}$) and is then adjusted gradually to the target AFR ($\lambda_{tar}$). After that, the AFR at the upstream of the TWC 60 is maintained as the target AFR ($\lambda_{tar}$) until the vehicle speed is increased again. If the vehicle speed begins to be increased, the AFR at the upstream of the TWC 60 is rapidly recovered to the stoichiometric AFR (λ=1).

Here, 'rapidly adjusting, increasing, reducing, or recovering to a specific AFR' when a specific condition is satisfied means adjusting a fuel injection amount for the AFR to be the specific AFR when the specific condition is satisfied. For example, 'rapidly adjusting to a target AFR' when a specific condition is satisfied means rapidly injecting the fuel amount that causes an AFR at an upstream of a TWC 60 to be the target AFR based on a current intake amount when the specific condition is satisfied.

Here, 'gradually adjusting, increasing, reducing, or recovering to a specific AFR' when a specific condition is satisfied means adjusting a fuel injection amount for the AFR to be the specific AFR within a predetermined time interval when the specific condition is satisfied. For example, 'gradually adjusting to a target AFR' when a specific condition is satisfied means gradually increasing or reducing an AFR to the target AFR from when the specific condition is satisfied to when the predetermined time interval has passed. At the instant time, the fuel amount is gradually increased or reduced during the predetermined time interval.

Referring to FIG. 3 and FIG. 4, the first slip concentration X1 and the third slip concentration X3 are relatively low and the second slip concentration X2 is relatively high when the AFR control at the upstream of the TWC 60 is performed according to the first control strategy, while the second slip concentration X2 is relatively low and the first slip concentration X1 and the third slip concentration X3 are relatively high when the AFR control at the upstream of the TWC 60 is performed according to the second control strategy. Resultantly, it may be seen that the first slip concentration X1 and the third slip concentration X3 are reduced if the AFR at the upstream of the TWC 60 is rapidly adjusted to the target AFR ($\lambda_{tar}$) in early oxygen purge, while the second slip concentration X2 is reduced if a duration during which the AFR at the upstream of the TWC 60 is maintained as the target AFR ($\lambda_{tar}$) is increased. That is, it may be seen that the AFR control pattern influences on all of the first, second, and third slip concentrations X1, X2, and X3.

FIG. 5 and FIG. 6 are graphs for comparing the first, second, and third slip concentrations X1, X2, and X3 according to the target AFR when the oxygen purge of the TWC 60 is performed. The AFR control pattern of the third control strategy is the same as or similar to that of the fourth control strategy, and the oxygen purge duration of the third control strategy is the same as that of the fourth control strategy. The target AFR ($\lambda_{tar}$) of the third control strategy is about 0.84 and the target AFR ($\lambda_{tar}$) of the fourth control strategy is about 0.78.

According to the AFR control pattern of the third control strategy and the fourth control strategy, if the oxygen purge begins after the fuel cut-off is performed due to decrease of the vehicle speed, the AFR at the upstream of the TWC 60 is rapidly adjusted to a predetermined rich AFR (λ>$\lambda_{tar}$) and is then adjusted gradually to the target AFR ($\lambda_{tar}$). After that, the AFR at the upstream of the TWC 60 is maintained as the target AFR ($\lambda_{tar}$) until the vehicle speed is increased again. If the vehicle speed begins to be increased, the AFR at the upstream of the TWC 60 is rapidly recovered to the stoichiometric AFR (λ=1).

Referring to FIG. 5 and FIG. 6, the first slip concentration X1 is reduced while there is little difference in the second slip concentration X2 and the third slip concentration X3 if the AFR at the upstream of the TWC 60 is controlled according to the fourth control strategy, compared with controlling the AFR at the upstream of the TWC 60 according to the third control strategy. Resultantly, it may be seen that the target AFR ($\lambda_{tar}$) influences on the first slip concentration X1, but hardly affects the second slip concentration X2 and the third slip concentration X3. Furthermore, as the target AFR ($\lambda_{tar}$) becomes lower (i.e., the target AFR becomes richer), the first slip concentration X1 decreases.

FIG. 7 and FIG. 8 are graphs for comparing the first, second, and third slip concentrations X1, X2, and X3 according to the oxygen purge duration during which the oxygen purge of the TWC 60 is performed. The AFR control pattern of the fifth control strategy is the same as or similar to that of the sixth control strategy, and the target AFR of the fifth control strategy is the same as that of the sixth control strategy. However, the oxygen purge duration t1 of the fifth control strategy is shorter than that t2 of the sixth control strategy.

According to the AFR control pattern of the fifth control strategy and the sixth control strategy, if the oxygen purge begins after the fuel cut-off is performed due to decrease of the vehicle speed, the AFR at the upstream of the TWC 60 is rapidly adjusted to a predetermined rich AFR ($\lambda > \lambda_{tar}$) and is then adjusted gradually to the target AFR ($\lambda_{tar}$). After that, the AFR at the upstream of the TWC 60 is maintained as the target AFR ($\lambda_{tar}$) until the vehicle speed is increased again. If the vehicle speed begins to be increased, the AFR at the upstream of the TWC 60 is rapidly recovered to the stoichiometric AFR ($\lambda=1$).

Referring to FIG. 7 and FIG. 8, it may be seen that there is little difference in the first slip concentration X1 and the second slip concentration X2 while the third slip concentration X3 is greatly reduced if the AFR at the upstream of the TWC 60 is controlled according to the sixth control strategy, compared with controlling the AFR at the upstream of the TWC 60 according to the fifth control strategy. Resultantly, it may be seen that the oxygen purge duration affects the third slip concentration X3, but hardly affects the first slip concentration X1 and the second slip concentration X2. Furthermore, it may be seen that the longer the oxygen purge duration, the lower the third slip concentration X3.

FIG. 9 is a graph for comparing the first, second, and third slip concentrations X1, X2, and X3 according to a target AFR maintaining duration (a duration for which the target AFR is maintained) when the oxygen purge of the TWC 60 is performed. The AFR control pattern of the seventh control strategy is the same as or similar to that of the eighth control strategy, and the target AFR of the seventh control strategy is the same as that of the eighth control strategy. However, the target AFR is maintained before the vehicle is accelerated according to the seventh control strategy, while target AFR is maintained after the vehicle is accelerated according to the eighth control strategy.

According to the AFR control pattern of the seventh control strategy and the eighth control strategy, if the oxygen purge begins after the fuel cut-off is performed due to decrease of the vehicle speed, the AFR at the upstream of the TWC 60 is rapidly adjusted to a predetermined rich AFR ($\lambda > \lambda_{tar}$) and is then adjusted gradually to the target AFR ($\lambda_{tar}$). After that, the AFR at the upstream of the TWC 60 is maintained as the target AFR ($\lambda_{tar}$) until the oxygen purge is finished.

According to the AFR control pattern of the seventh control strategy, if the oxygen purge is finished, the AFR at the upstream of the TWC 60 is rapidly recovered as the stoichiometric AFR ($\lambda=1$). At the instant time, the vehicle accelerates and the AFR at the downstream of the TWC 60 becomes the rich AFR temporarily.

According to the AFR control pattern of the eighth control strategy, the AFR at the upstream of the TWC 60 is maintained as the target AFR ($\lambda_{tar}$) even if the oxygen purge is finished, and is further maintained as the target AFR ($\lambda_{tar}$) from when the vehicle accelerates to when a predetermined delay time has passed. After that, the AFR at the upstream of the TWC 60 is rapidly recovered to the stoichiometric AFR ($\lambda=1$).

Here, a time when the oxygen purge is finished means a time when the oxygen storing capacity (OSC) of the TWC 60 is completely consumed, i.e., a time when the AFR at the downstream of the TWC 60 becomes the stoichiometric AFR. Here, that the AFR at the downstream of the TWC 60 becomes the stoichiometric AFR means that the AFR at the downstream of the TWC 60 becomes within 97%-100% of the stoichiometric AFR and is the lean AFR or the stoichiometric AFR. The AFR at the downstream of the TWC 60 may be detected by the second oxygen sensor 46.

Referring to FIG. 9, it may be seen that there is little difference in the first slip concentration X1 and the second slip concentration X2 while the third slip concentration X3 is greatly reduced if the AFR at the upstream of the TWC 60 is controlled according to the eighth control strategy, compared with controlling the AFR at the upstream of the TWC 60 according to the seventh control strategy. Resultantly, it is necessary to maintain the AFR at the upstream of the TWC 60 as the target AFR ($\lambda_{tar}$) from when the vehicle accelerates to when the predetermined delay time has passed, to reduce the third slip concentration X3.

In summary, it is necessary to set the target AFR ($\lambda_{tar}$) to be richer, to rapidly adjust the AFR at the upstream of the TWC to the target AFR ($\lambda_{tar}$) in early oxygen purge, to increase the duration during which the AFR at the upstream of the TWC 60 is maintained as the target AFR ($\lambda_{tar}$), and to increase the oxygen purge duration, to reduce the first, second, and third slip concentrations X1, X2, and X3. Furthermore, it is also necessary to maintain the AFR at the upstream of the TWC 60 as the target AFR ($\lambda_{tar}$) from when the vehicle accelerates to when the predetermined delay time has passed.

Inputs and outputs of the controller 70 in the system of controlling an oxygen purge of a three-way catalyst according to an exemplary embodiment of the present invention will hereinafter be described in detail with reference to FIG. 10.

FIG. 10 is a block diagram of a system of controlling an oxygen purge of a TWC according to an exemplary embodiment of the present invention.

FIG. 10 illustrates a simple example of inputs and outputs of the controller 70 to implement the system of controlling an oxygen purge of a three-way catalyst according to an exemplary embodiment of the present invention. It may be understood that the inputs and the outputs of the controller 70 according to an exemplary embodiment of the present invention are not limited to the exemplary embodiment illustrated in FIG. 10.

As shown in FIG. 10, the controller 70 is electrically connected to the temperature sensor 42, the first and second oxygen sensors 44 and 46, the vehicle speed sensor 48, the engine rotation speed sensor 50, and the air flowmeter 52, and receives the signals corresponding to the values detected by the sensors 42, 44, 46, 48, 50, and 52.

The temperature sensor 42 detects the temperature of the exhaust gas at the upstream of the TWC 60 and transmits the signal corresponding thereto to the controller 70. The controller 70 may predicts a bed temperature of the TWC 60 based on the signal.

The first oxygen sensor 44 detects the concentration of the $O_2$ contained in the exhaust gas at the upstream of the TWC 60 and transmits the signal corresponding thereto to the controller 70. The second oxygen sensor 46 detects the concentration of the $O_2$ contained in the exhaust gas at the downstream of the TWC 60 and transmits the signal corresponding thereto to the controller 70. The controller 70 can determine whether the TWC 60 is operating normally based on the signals of the first and second oxygen sensors 44 and 46, and performs the AFR control of the engine 10.

The vehicle speed sensor 48 detects the vehicle speed and transmits the signal corresponding thereto to the controller 70. The controller 70 may determine whether the vehicle accelerates or decelerates based on the vehicle speed detected by the vehicle speed sensor 48.

The engine rotation speed sensor 50 detects the rotation speed of the engine 10 and transmits the signal corresponding thereto to the controller 70. The controller 70 may further determine whether the vehicle accelerates or decelerates based on the rotation speed of the engine 10 detected by the engine rotation speed sensor 50.

The air flowmeter 52 is mounted on an intake pipe or an intake duct to detect the amount of the air (i.e., the intake amount) flowing into the intake system, and transmits the signal corresponding thereto to the controller 70.

The controller 70 determines the combustion state, the AFR of the exhaust gas, whether the TWC 60 operates normally, whether the oxygen purge is finished, and/or the driving condition of the vehicle based on the values detected by the sensors 42, 44, 46, 48, 50, and 52. The controller 70 may control at least one of the ignition timing of the ignition plug 15, the AFR of the exhaust gas, and the fuel injection amount and the fuel injection timing of the injector 18 based on the determination.

The controller 70 can determine the fuel amount that forms a desired AFR of the exhaust gas based on the current intake amount, and control the AFR at the upstream of the TWC 60 by controlling the injector 18 to inject the determined fuel amount.

A method of controlling an oxygen purge of a three-way catalyst according to an exemplary embodiment of the present invention will hereinafter be described in detail with reference to FIG. 11.

Figure 11:
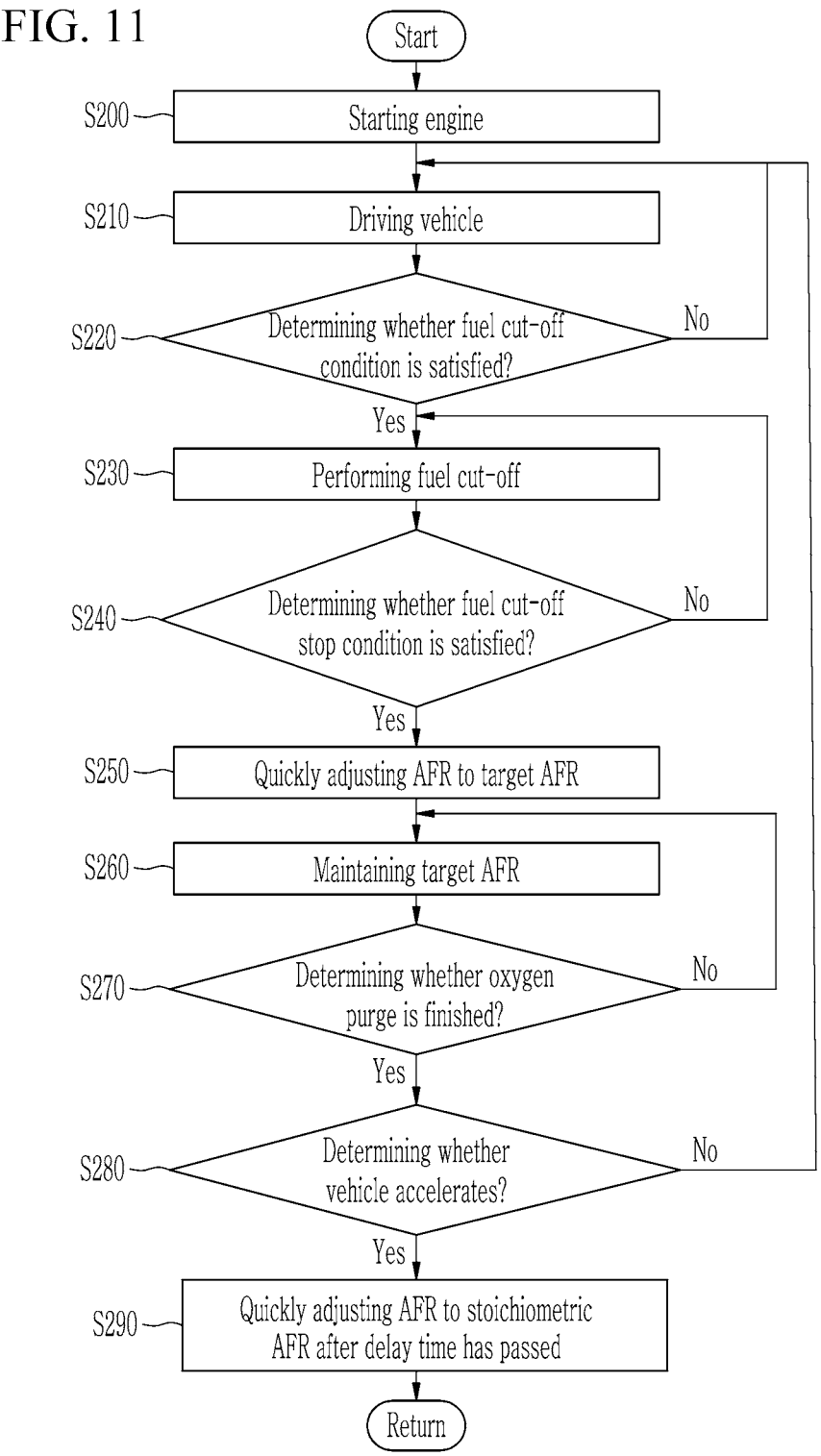
FIG. 11 is a flowchart of a method of controlling an oxygen purge of a TWC according to an exemplary embodiment of the present invention.

FIG. 11 is a flowchart of a method of controlling an oxygen purge of a TWC according to an exemplary embodiment of the present invention.

As shown in FIG. 11, when the engine is started at step S200, the vehicle is driven according to manipulation of the driver at step S210. That is, the controller 70 determines a current driving condition based on the signals transmitted from a plurality of sensors 42, 44, 46, 48, 50, and 52, and controls the operation of the engine according to the current driving condition.

While the vehicle is driven, the controller 70 determines whether a fuel cut-off condition is satisfied at step S220. For example, if a driver releases his or her foot from the accelerator pedal on a downhill road, the fuel cut-off condition may be satisfied. Since the fuel cut condition is well-known to those skilled in the art, further description will be omitted.

If the fuel cut-off condition is not satisfied at the step S220, the controller 70 returns to the step S210 to control the operation of the engine 10. Therefore, the vehicle is driven by the manipulation of the driver before the engine is turned off.

If the fuel cut-off condition is satisfied at the step S220, the controller 70 performs the fuel cut-off at step S230. Thus, supply of the fuel into the combustion chamber 12 is stopped and the vehicle travels by inertia.

During the fuel cut-off, the controller 70 determines whether a fuel cut-off stop condition is satisfied at step S240. For example, the fuel cut-off stop condition may be satisfied if the driver accelerates the vehicle by depressing the accelerator pedal again or the engine rotation speed is reduced below a predetermined rotation speed. Since the fuel cut-off stop condition is well-known to those skilled in the art, further description will be omitted.

If the fuel cut-off stop condition is not satisfied at the step S240, the controller 70 returns to the step S230 to cut-off the supply of the fuel into the combustion chamber 12.

If the fuel cut-off stop condition is satisfied at the step S240, the controller 70 resumes the supply of the fuel that was cut-off. Therefore, the $O_2$ stored in an oxygen storing material of the TWC 60 due to the fuel cut-off initiates to be removed. That is, the oxygen purge initiates to be performed.

The oxygen purge starts by rapidly adjusting the AFR at the upstream of the TWC 60 to the target AFR at step S250. Therefore, the first and second slip concentrations X1 and X2 may be reduced.

For example, if a fuel cut-off stop signal is input, the controller 70 determines the fuel amount for causing the AFR at the upstream of the TWC 60 to be the target AFR based on the current intake amount detected by the air flowmeter 52. The controller 70 controls the injector 18 to inject the determined fuel amount. Therefore, the AFR at the upstream of the TWC 60 is rapidly adjusted to the target AFR. For example, the target AFR may be, but not limited to, a value below 0.85 (based on the lambda).

After the AFR at the upstream of the TWC 60 is rapidly adjusted to the target AFR, the controller 70 maintains the AFR at the upstream of the TWC 60 as the target AFR at step S260. After that, the controller 70 determines whether the oxygen purge is finished at step S270. As described above, the controller 70 determines whether the oxygen purge is finished by determining whether the AFR at the downstream of the TWC 60 becomes the stoichiometric AFR based on the value detected by the second oxygen sensor 46.

If the oxygen purge is not finished at the step S270, the controller 70 returns to the step S260 to continuously maintain the AFR at the upstream of the TWC 60 as the target AFR.

If the oxygen purge is finished at the step S270, the controller 70 determines whether the vehicle accelerates at step S280. At the instant time, the controller 70 may determine whether the vehicle accelerates when a standby time has passed after the oxygen purge is finished. Furthermore, the controller 70 may continuously maintain the AFR at the upstream of the TWC 60 as the target AFR until the standby time has passed after the oxygen purge is finished. The second and third slip concentrations X2 and X3 may be reduced by maintaining the target AFR until the standby time has passed after the oxygen purge is finished. The standby time may be, but not limited to, a value within 0.5 second to 1 second.

If the vehicle does not accelerate at the step S280, the controller 70 returns to the step S210. Therefore, the AFR at the upstream of the TWC 60 is rapidly adjusted to the stoichiometric AFR, and is then controlled based on the driving condition of the vehicle.

If the vehicle accelerates at the step S280, the controller 70 rapidly adjusts the AFR at the upstream of the TWC 60 to the stoichiometric AFR after a delay time ($t_d$) has passed at step S290. Furthermore, the AFR at the upstream of the TWC 60 is maintained as the target AFR during the predetermined delay time ($t_d$). Therefore, the third slip concentration X3 may be reduced. The predetermined delay time ($t_d$) may be, but not limited to, a vale within 1 second to 3 seconds.

Figure 12:
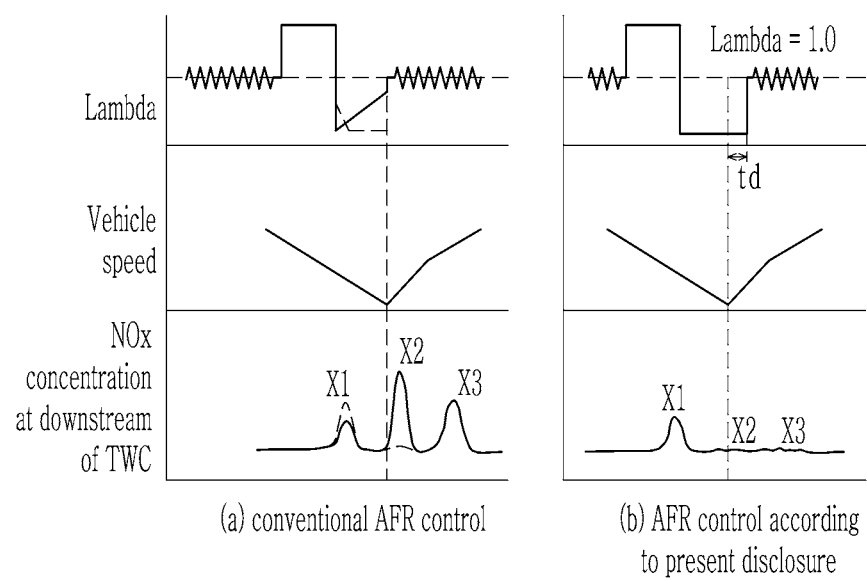
FIG. 12 is a graph showing examples of concentration of NOx slipped from a TWC when a conventional AFR control and an AFR control according to exemplary embodiments of the present invention are performed for the same vehicle speed change.

FIG. 12 is a graph showing examples of concentration of NOx slipped from a TWC when a conventional AFR control and an AFR control according to exemplary embodiments of the present invention are performed for the same vehicle speed change.

A left graph in FIG. 12 shows the AFR at the upstream of the TWC 60 and the concentration of the NOx slipped from the TWC 60 according to the conventional AFR control for the same vehicle speed change, and a right graph in FIG. 12 shows the AFR at the upstream of the TWC 60 and the concentration of the NOx slipped from the TWC 60 according to the AFR control of the present invention for the same vehicle speed change. Furthermore, a solid line represents the first AFR control pattern and the concentration of the NOx slipped from the TWC when the AFR is controlled according to the first AFR control pattern, and a dotted line represents the second AFR control pattern and the concentration of the NOx slipped from the TWC when the AFR is controlled according to the second AFR control pattern in the left graph of FIG. 12.

Referring to FIG. 12, if the AFR at the upstream of the TWC 60 is rapidly adjusted to the target AFR in the early oxygen purge, the first slip concentration X1 may be reduced. Furthermore, the second slip concentration X2 may be reduced by maintaining, by the controller, the target AFR until the oxygen purge is finished. Furthermore, the third slip concentration X3 may be reduced by further maintaining the target AFR during the predetermined delay time ($t_d$) after the vehicle accelerates.

According to the exemplary embodiment of the present invention, if the fuel cut-in condition is satisfied after the fuel cut-off, the AFR at the upstream of the TWC 60 is rapidly adjusted to the target AFR, the target AFR is maintained until the predetermined delay time ($t_d$) has passed after the vehicle accelerated, and the AFR at the upstream of the TWC 60 is then adjusted rapidly to the stoichiometric AFR. Therefore, all the first, second, and third slip concentrations X1, X2, and X3 may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an oxygen purge of a three-way catalyst (TWC), the method comprising:
    adjusting, by a controller, an air-fuel ratio (AFR) at an upstream of the TWC to a target AFR when the oxygen purge of the TWC after a fuel cut-off is performed;
    maintaining, by the controller, the target AFR until the oxygen purge is finished determining, by the controller, when a vehicle accelerates after the oxygen purge is finished; and
    maintaining, by the controller, the target AFR for a predetermined delay time, upon determining that the vehicle accelerates,
    wherein the oxygen purge is finished when the AFR at a downstream of the TWC reaches a stoichiometric AFR.

2. The method of claim 1, further including adjusting the AFR at the upstream of the TWC to the stoichiometric AFR after maintaining the target AFR for the predetermined delay time.

3. The method of claim 1, wherein the predetermined delay time is within a range of 1 second to 3 seconds.

4. The method of claim 1, further including adjusting the AFR at the upstream of the TWC to the stoichiometric AFR when the vehicle does not accelerate after the oxygen purge is finished.

5. The method of claim 1, wherein the target AFR is maintained for a standby time after the oxygen purge is finished, and whether the vehicle accelerates is determined after the standby time has passed.

6. A method of controlling an oxygen purge of a three-way catalyst (TWC), the method comprising:
    adjusting, by a controller, an air-fuel ratio (AFR) at an upstream of the TWC to a target AFR when the oxygen purge of the TWC after a fuel cut-off is performed;
    maintaining, by the controller, the target AFR until the oxygen purge is finished;
    determining, by the controller, when a vehicle accelerates after the oxygen purge is finished; and
    adjusting, by the controller, upon determining that the vehicle accelerates, the AFR at the upstream of the TWC to a stoichiometric AFR after the target AFR is maintained for a predetermined delay time.

7. The method of claim 6, wherein the oxygen purge is finished when the AFR at a downstream of the TWC reaches the stoichiometric AFR.

8. The method of claim 6, wherein the predetermined delay time is within a range of 1 second to 3 seconds.

9. The method of claim 6, further including adjusting, by the controller, the AFR at the upstream of the TWC to the stoichiometric AFR when the vehicle does not accelerate after the oxygen purge is finished.

10. The method of claim 6, wherein the target AFR is maintained for a standby time after the oxygen purge is finished, and whether the vehicle accelerates is determined after the standby time has passed.

11. A system of controlling an oxygen purge of a three-way catalyst (TWC), the system comprising:
    an engine configured of generating power by burning a mixture of an air and a fuel and exhausting an exhaust gas through an exhaust pipe;
    an injector configured of supplying the fuel into the engine;
    a controller connected to the injector and configured to adjust an air-fuel ratio (AFR) at an upstream of the TWC,
    wherein the TWC is mounted on the exhaust pipe at a downstream of the engine and is configured to purify emission contained in the exhaust gas,
    wherein the controller is configured to adjust the AFR at the upstream of the TWC by determining a fuel amount which is to be supplied to the engine based on a current intake amount and controlling the injector to inject the determined fuel amount,
    wherein the controller is configured to adjust the AFR at the upstream of the TWC to a target AFR and to maintain the target AFR until the oxygen purge is finished, when the oxygen purge during which oxygen in the TWC is purged after a fuel cut-off during which fuel injection is stopped, is performed, wherein the oxygen purge is finished when the AFR at a downstream of the TWC reaches a stoichiometric AFR, and wherein the controller is configured to determine when a vehicle accelerates after the oxygen purge is finished, and to maintain, when the vehicle accelerates, the target AFR for a predetermined delay time.

12. The system of claim 11, wherein the predetermined delay time is within a range of 1 second to 3 seconds.

13. The system of claim 11, wherein the controller is configured to adjust the AFR at the upstream of the TWC to the stoichiometric AFR when the predetermined delay time has passed after the oxygen purge is finished.

14. The system of claim 11, wherein the controller is configured to adjust the AFR at the upstream of the TWC to the stoichiometric AFR when the vehicle does not accelerate after the oxygen purge is finished.

15. The system of claim 11, wherein the controller is configured to maintain the target AFR for a standby time after the oxygen purge is finished, and to determine when the vehicle accelerates after the standby time has passed.

* * * * *